(12) United States Patent
Lin et al.

(10) Patent No.: US 11,988,245 B1
(45) Date of Patent: May 21, 2024

(54) SUCKER BASE DEVICE

(71) Applicant: Dongguan Lanparte Television Equipment Technology Co., Ltd., Dongguan (CN)

(72) Inventors: Jinsu Lin, Dongguan (CN); Xiaofeng Hao, Dongguan (CN)

(73) Assignee: Dongguan Lanparte Television Equipment Technology Co., Ltd., Dongguan (CN)

(*) Notice: Subject to any disclaimer, the term of this patent is extended or adjusted under 35 U.S.C. 154(b) by 0 days.

(21) Appl. No.: 18/097,356

(22) Filed: Jan. 16, 2023

(51) Int. Cl.
*F16B 47/00* (2006.01)

(52) U.S. Cl.
CPC .................. *F16B 47/006* (2013.01)

(58) Field of Classification Search
CPC ..... F16B 47/006; F16B 47/00; F16M 13/022; B60R 2011/0056
USPC ......... 248/467, 206.2, 205.8, 205.5
See application file for complete search history.

(56) References Cited

U.S. PATENT DOCUMENTS

| | | | |
|---|---|---|---|
| 6,478,271 B1* | 11/2002 | Mulholland | F16B 47/00 248/205.8 |
| 6,896,228 B1* | 5/2005 | Lu | A47K 10/10 248/205.8 |
| 7,357,361 B2* | 4/2008 | Yen | F16M 11/2064 248/205.8 |
| 2002/0175250 A1* | 11/2002 | Lian | F16B 47/00 248/205.5 |
| 2007/0120027 A1* | 5/2007 | Chang | F16M 13/022 248/205.5 |
| 2007/0210225 A1* | 9/2007 | Carnevali | F16B 47/00 248/205.8 |
| 2011/0024587 A1* | 2/2011 | Tsai | F16M 13/00 248/206.2 |
| 2011/0168856 A1* | 7/2011 | Tu | F16B 47/006 248/205.6 |
| 2015/0369276 A1* | 12/2015 | Balmer | F16B 47/00 248/205.8 |

* cited by examiner

*Primary Examiner* — Bradley Duckworth
(74) *Attorney, Agent, or Firm* — Zhigang Ma

(57) ABSTRACT

The present invention discloses a sucker base device, which comprises a suction cup, a cup upper cover, and a pressure driving nut. A threaded rod is connected to an upper surface of the suction cup. The cup upper cover covers the suction cup. The rod penetrates through a top surface of the cup upper cover and has a protrusion section exposed outside the cup upper cover. The nut is threaded to the rod, is supported on the top surface of the cup upper cover, and is allowed to a rotary motion. By rotating the nut, the rod is driven to lift towards the cup upper cover, to form a negative pressure between the suction cup and a surface of sucked object. The device has compact and ingenious structure, lowered cost, and is readily to be realized and popularized.

9 Claims, 5 Drawing Sheets

100

SUCKER BASE DEVICE

TECHNICAL FIELD

The present invention relates to technical field of sucker devices, and more particularly to a sucker base device.

BACKGROUND

A sucker is a kind of pendant which is adsorbed on an object due to pressure difference between internal and external atmospheric, or a tool for grasping an object. Vacuum sucker is a technology that maintains attachment of two objects through forming vacuum degree there-between. The vacuum sucker is available both in industrial field and in civil field. In industry, with the cooperation of other automatic mechanization equipments, the vacuum sucker is used to pick up, transfer and position a work-piece by controlling vacuum degree of the sucker during operation. In civil use, the vacuum sucker mainly meets demand of people to hang living articles at any time.

Chinese Utility Model Publish No. CN212245285U discloses an unpowered vacuum chuck for aluminum, which has a plurality of sucker bodies, a shell, a piston, a plurality of connecting pipes and a connecting rod to drive the piston to move. The connecting pipes communicate the sucker bodies to the shell, respectively. In use, aluminum is closely attached to the sucker bodies. The piston is caused to form displacement with respect to the shell and thus a negative pressure environmental is automatically generated in the shell and the sucker bodies in communication with the shell. Accordingly, the aluminum is adsorbed onto the sucker bodies due to pressure difference. Although the vacuum chuck can create a negative pressure environmental without a vacuum pump, it still uses a piston suction vacuum principle, is relatively complex in structure and inconvenient to operate.

SUMMARY OF THE INVENTION

Therefore, a sucker base device is provided, which has a compact structure and is readily operated.

A sucker base device comprises a suction cup, a cup upper cover, and pressure driving nut. A threaded rod is connected to an upper surface of the suction cup. The cup upper cover covers the suction cup. The threaded rod penetrates through a top surface of the cup upper cover and has a protrusion section exposed outside the top surface of the cup upper cover. The pressure driving nut is threaded to the protrusion section of the threaded rod, is supported on the top surface of the cup upper cover, and is allowed to a rotary motion. By rotating the pressure driving nut, the threaded rod is driven to move and thus carries a connection portion of the suction cup through which the suction cup is connected to the threaded rod to lift up towards the cup upper cover, so as to form a negative pressure between the suction cup and a surface of an object.

Preferably, the suction cup comprises an adsorption edge and the connection portion connected to the threaded rod. A lower surface of the adsorption edge has a height difference with respect to a bottom surface of the connection portion to form an adsorption space, i.e., the lower surface of the adsorption edge has a relative height with respect to a bottom surface of the connection portion. Preferably, an outer surface of the threaded rod is provided with three or multiple threads.

Preferably, a top surface of the suction cup is provided with a protrusion ring which is adjacent to the adsorption edge and has a relative height with respect to a top of the adsorption edge. The protrusion ring is disposed around the connection portion. The connection portion is spaced from and connected to the protrusion ring by a soft portion. An upper surface of the protrusion ring is provided with a plurality of first teeth uniformly arranged thereon, and a bottom surface of the cup upper cover is provided with a plurality of second teeth uniformly arranged at edge thereof. The second teeth are disposed on the first teeth, so that the first teeth engage to the second teeth.

Preferably, a vent handle extends from a lateral surface of the suction cup along a radial direction of the suction cup. The vent handle is configured for causing air to enter the adsorption space, and thus achieving negative pressure status in the adsorption space.

Preferably, a middle top of the cup upper cover defines a mounting hole through which the threaded rod penetrates. The top surface of the cup upper cover defines an annular groove, which is disposed around the mounting hole. A bottom wall defining the annular groove defines two pairs of first blind holes.

Preferably, the pressure driving nut is in a cylindrical form, and a bottom edge of the pressure driving nut defines a pair of second blind holes opening upwards. The pair of second blind holes is positioned to face any of the first blind holes at desired rotary angle. A positioning marble assembly is provided in each of the two second blind holes.

Preferably, the pressure driving nut comprises an inner sidewall and an outer sidewall. The inner sidewall is provided with an inner thread through which the pressure driving nut engages to an outer thread of the threaded rod.

Preferably, the device further comprises a sucker switch handle which extends from a periphery of the pressure driving nut, or alternatively extends from a periphery of a sheath engaged to the periphery of the pressure driving nut, for facilitating to push the pressure driving nut through the sucker switch handle. The sheath carries the pressure driving nut to rotate.

Preferably, the pressure driving nut is provided with a plurality of first vertical teeth uniformly arranged in the outer sidewall thereof. The sheath is provided with a plurality of second vertical teeth uniformly arranged in the inner sidewall thereof. The second vertical teeth engage to the first vertical teeth.

Preferably, the device further comprises an upper connection shield. Two inner threaded columns are provided on an upper edge of the cup upper cover and are disposed adjacent a periphery of the annular groove. The two inner threaded columns are disposed at an extension line of a diameter of the annular groove. The upper connection shield engages to the two inner threaded columns by bolts and is disposed above the pressure driving nut.

In the sucker base device, when the pressure driving nut is driven to rotate without elevation, the threaded rod elevates and carries the suction cup to elevate, so as to form a negative pressure between the suction cup and a surface of an object. Accordingly, the device is able to fetch and optionally further carry object. When the pressure driving nut is reversely rotated, the threaded rod and the suction cup are driven to be initial position and status, and then the object is released from the suction cup. The sucker base device has a compact structure with screw lifting structure inside to stably sucking the object, and is readily operated.

DETAILED DESCRIPTION OF THE INVENTION

Figure 1:
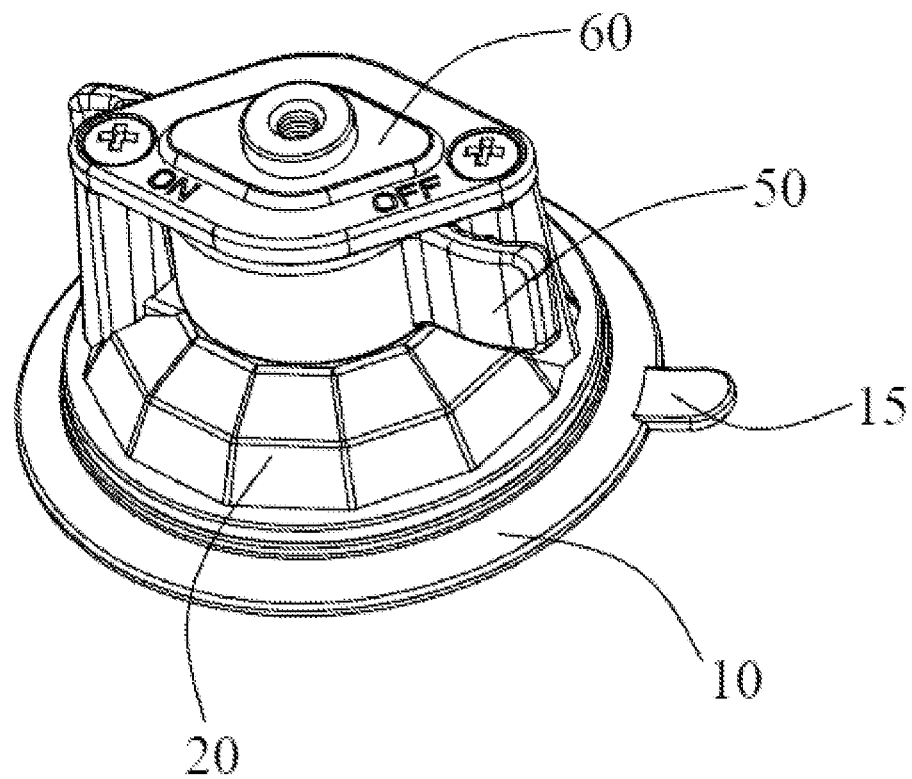
FIG. 1 is a perspective schematic view of a sucker base device in accordance to an embodiment of the present invention.
Figure 2:
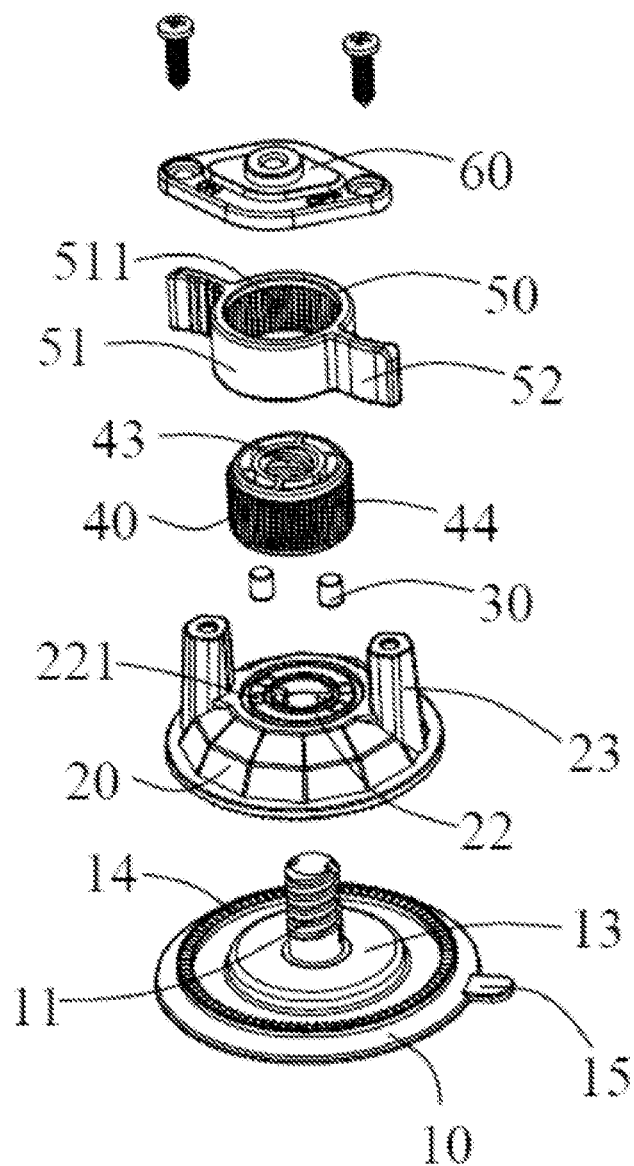
FIG. 2 is an explored schematic view of the sucker base device in FIG. 1.
Figure 3:
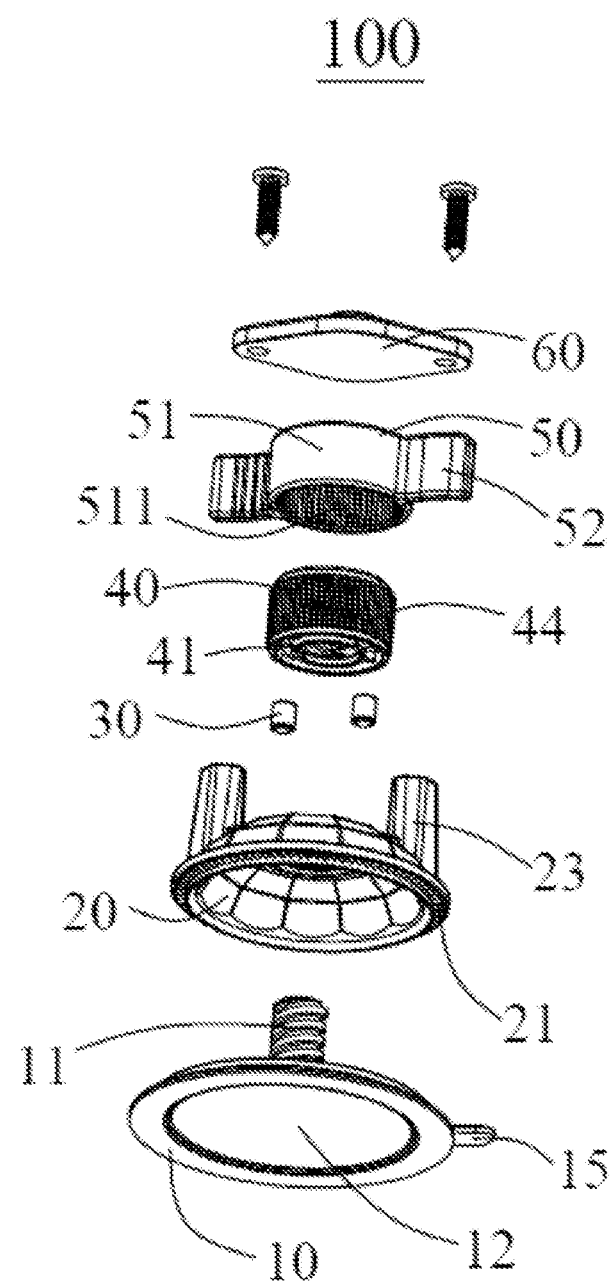
FIG. 3 is another explored schematic view of the sucker base device in another view angle in FIG. 1.
Figure 4:
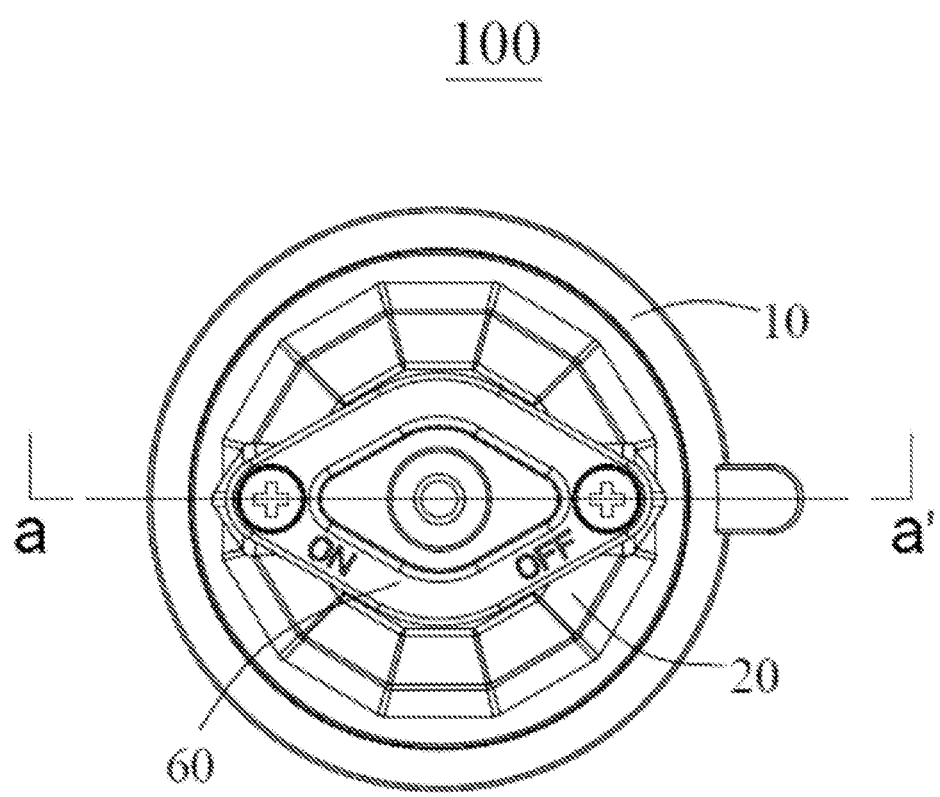
FIG. 4 is a top view of the sucker base device in FIG. 1.
Figure 5:
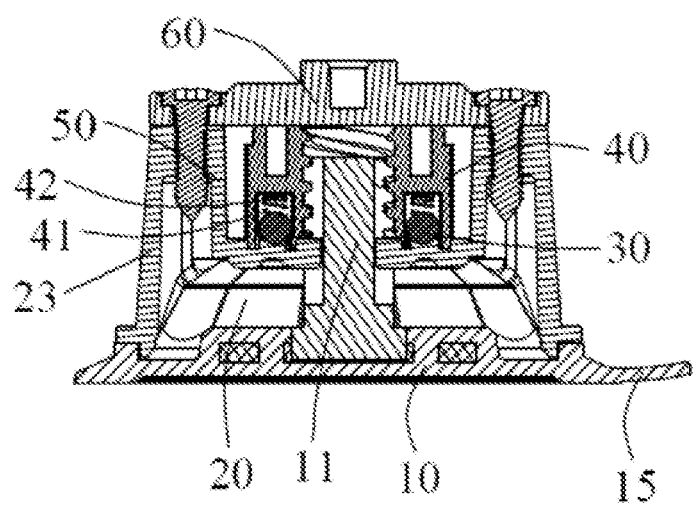
FIG. 5 is a sectional view of the sucker base device along a line a-a' in FIG. 1.

The present disclosure takes a sucker base device as an example, and will be described in detail below in combination with specific embodiments and the accompanying drawings.

Referring to FIG. 1 through FIG. 5, a sucker base device 100 in accordance to an embodiment of the present invention is illustrated, which comprises a suction cup 10, a cup upper cover 20 and a pressure driving nut 40. A threaded rod 11 is connected to an upper surface of the suction cup 10. The cup upper cover 20 covers the suction cup 10. The threaded rod 11 penetrates through a top surface of the cup upper cover 20 and has a protrusion section exposed outside the top surface of the cup upper cover 20. The pressure driving nut 40 is threaded to the protrusion section of the threaded rod 11, is supported on the top surface of the cup upper cover 20, and is allowed to a rotary motion. By rotating the pressure driving nut 40, the threaded rod 11 is driven to move and thus carries a connection portion 13 of the threaded rod 11 to elevate towards the cup upper cover 20, so as to form a negative pressure between the suction cup 10 and a surface of the object. The suction cup 10 is connected to the threaded rod 11 through the connection portion 13.

Preferably, the suction cup 10 comprises an adsorption edge and the connection portion 13 connected to the threaded rod 11. A lower surface of the adsorption edge has a height difference with respect to a bottom surface of the connection portion 13 to form an adsorption space, i.e., the lower surface of the adsorption edge has a relative height with respect to the bottom surface of the connection portion 13. Preferably, an outer surface of the threaded rod 11 is provided with three or multiple threads.

Specifically, the suction cup 10 is in a form of bowl, tray or dish. The suction cup 10 has a bottom face and a top face opposing to the bottom face. The adsorption space 12 is defined below the bottom face of the suction cup 10. The bottom face of the suction cup 10 faces towards object to be sucked and is configured to absorb the object.

Specifically, the connection portion 13 is disposed at a center portion of the suction cup 10, and the threaded rod 11 is fixedly disposed on the connection portion 13. The threaded rod 11 is driven to rotate and accordingly carries the connection portion 13 of the suction cup 10 to move up and down.

Specifically, the three or multiple threads in an upper periphery of the threaded rod 11 is capable of lifting the upper surface of the suction cup 10 at three times distance of the thread pitch by rotating the threaded rod 11 for one circle. That is, when the pressure driving nut 40 carry the threaded rod 11 to rotate, the connection portion 13 of the suction cup 10 will obtain a rapid elevation through the threaded rod 11.

Preferably, the top face of the suction cup 10 is provided with a protrusion ring which is adjacent to the adsorption edge and has a relative height with respect to a top of the adsorption edge. The protrusion ring is disposed around the connection portion 13. The connection portion 13 is spaced from and connected to the protrusion ring by a soft portion. An upper surface of the protrusion ring is provided with a plurality of first teeth 14 uniformly arranged thereon, and a bottom surface of the cup upper cover 20 is provided with a plurality of second teeth 21 uniformly arranged at edge thereof. The second teeth 21 are disposed on the first teeth 14, so that the first teeth 14 engage to the second teeth 21.

Specifically, the second teeth 21 formed on the bottom surface of the cup upper cover 20 engage to the first teeth 14 formed on the protrusion ring of the suction cup 10, so that the cup upper cover 20 and the suction cup 10 are combined to be a whole to avoid sliding motion between the cup upper cover 20 and the suction cup 10.

Specifically, the cup upper cover 20 engages to the suction cup 10 and thus defines a closed space therebetween. The cup upper cover 20 is usefully rigid component. For example, the cup upper cover 20 is made of metal material or rigid plastic and does not deform under pressure. When screwing the pressure driving nut 40, the connection portion 13 of the suction cup 10 moves toward the cup upper cover 20, but the cup upper cover 20 is unchanged in position and does not deform.

Preferably, a vent handle 15 extends from a lateral surface of the suction cup 10 along a radial direction of the suction cup 10. The vent handle 15 is configured for causing air to enter the adsorption space, and thus recovering atmospheric pressure status in the adsorption space.

Specifically, the vent handle 15 extends from a lower periphery of the suction cup 10, and is elongated outside at a radial direction of the suction cup 10.

When object is absorbed to the suction cup 10, a corner or a point of periphery of the suction cup 10 can be lifted up through the vent handle 15 so that air enters the adsorption space, thereby releasing the object from the suction cup 10.

Preferably, a middle top of the cup upper cover 20 defines a mounting hole through which the threaded rod 11 penetrates. The top surface of the cup upper cover 20 defines an annular groove 22, which is disposed around the mounting hole. A bottom wall defining the annular groove 22 defines two pairs of first blind holes 221. The pressure driving nut 40 is preferably in a cylindrical form, and a bottom edge of the pressure driving nut 40 defines a pair of second blind holes 41 opening upwards. The pair of second blind holes 41 is positioned to face one pair of the first blind holes 221 at desired rotary angle. A positioning marble assembly is provided in each of the two second blind holes 41. The positioning marble assembly is configured to locate the pressure driving nut 40 to predetermined positions during the rotation of the pressure driving nut 40, so as to prevent the pressure driving nut 40 to displace.

Specifically, the annular groove 22 and the mounting hole are arranged in a concentric circle, and a lower edge of the pressure driving nut 40 is engaged into the annular groove 22 to prevent the pressure driving nut 40 from sliding.

Specifically, a spring 42 is equipped at a bottom of the second blind holes 41, and a top wall defining each second blind hole 41 has an inward convex ridge. The positioning marble assembly comprises a positioning marble 30, which is arranged in the second blind hole 41. The diameter of the top wall defining each second blind hole 41 is smaller than that of the positioning marble 30. The positioning marble 30 is clamped at an orifice of the second blind hole 41 under the action of the spring 42 and the ridge, but does not fall.

Specifically, the positioning marble 30 uses a spherical ball or a cylindrical positioning column with a convex bottom surface, and a bottom surface of which is clamped or limited in the first blind hole 221, so as to plays a positioning role on the pressure driving nut 40.

Specifically, the two pairs of the first blind holes 221 comprise a pair of start blind holes and a pair of off blind holes. A first distance between the two start blind holes is the same to a second distance between the two off blind holes. An angle and a distance defined between adjacent start blind hole and off blind hole are the same to a rotary angle and a travel distance of the sucker switch handle 50, respectively.

Preferably, the pressure driving nut 40 comprises an inner sidewall and an outer sidewall. The inner sidewall is provided with an inner thread 43 through which the pressure driving nut 40 engages to an outer thread of the threaded rod.

Preferably, the device further comprises a sucker switch handle 50, which directly extends from a peripheral of pressure driving nut 40, or alternatively extends from a peripheral of a sheath 51 engaged to the peripheral of the pressure driving nut 40, for facilitating to push the pressure driving nut 40 through the sucker switch handle 50. The sheath 51 carries the pressure driving nut 40 to rotate synchronously.

Preferably, the pressure driving nut 40 is provided with a plurality of first vertical teeth 44 uniformly arranged in the outer sidewall thereof. The sheath 51 is provided with a plurality of second vertical teeth 511 uniformly arranged in the inner sidewall thereof. The second vertical teeth 511 engage to the first vertical teeth 44.

In this embodiment, the sheath 51 is adopted, that is, the sucker switch handle 50 includes a cylindrical sheath 51 and a handle 52 extending from the sheath 51. An inner diameter of the sheath 51 is consistency with an outer diameter of the pressure driving nut 40. The sucker switch handle 50 is sleeved on the outside periphery of the pressure driving nut 40. The second vertical tooth 511 engages with the first vertical tooth 44. When the sucker switch handle 50 is caused to rotate, the pressure driving nut 40 rotates synchronously.

Preferably, the device further comprises an upper connection shield 60. Two inner threaded columns 23 are provided on an upper edge of the cup upper cover 20 and are disposed adjacent a peripheral of the annular groove 22. The two inner threaded columns 23 are disposed at an extension line of a diameter of the annular groove 22. The upper connection shield 60 engages to the two inner threaded columns 22 by bolts and is disposed above the pressure driving nut 40.

Specifically, the upper connection shield 60 is fixed on the cup upper cover 20 by bolts, and the pressure driving nut 40 and the sucker switch handle 50 are installed between the upper connection shield 60 and the cup upper cover 20. The sucker switch handle 50 is driven to rotate, so as to make the suction cup 10 in the sucked state or relaxed state, according to different positions of the sucker switch handle 50 in different states. Switch marks are marked at corresponding positions on the upper connection shield 60 to identify different working states of the suction cup 10.

In particular application, the cup upper cover 20 is engaged onto soft suction cup 10, and the threaded rod 11 passes through the mounting hole of the cup upper cover 20.

In some embodiments, the suction cup 10 is made of soft rubber, or the adsorption edge could be made of, e.g., rigid material and the threaded rod 11 is connected to the adsorption edge through a soft material for facilitating elevation of the threaded rod 11. The pressure driving nut 40 is threaded onto the threaded rod 11. After an object is attached to suction cup 10, by rotating the pressure driving nut 40 to lift up the threaded rod 11, a negative pressure is generated between the suction cup 10 (e.g., made of soft rubber) and the object. The bottom surfaces of the positioning marbles 30 at the lower edge of the pressure driving nut 40 are limited in the off blind holes. The sucker switch handle 50 is sleeved on the outside of the pressure driving nut 40, and the handle 52 is pointed to the "off" position. The upper connection shield 60 covers on the sucker switch handle 50 and the pressure driving nut 40, and is fixed on the cup upper cover 20.

When using the sucker base device 100, the soft suction cup 10 is stably placed on an object to be sucked, or the soft suction cup 10 is attached to a plain surface to be sucked (e.g., a wall surface), then the handle 52 is driven to turn from "off" to "on", as shown in FIG. 1, and the pressure driving nut 40 is caused to rotate synchronously. Accordingly, the threaded rod 11 drives the connection portion of the soft suction cup 10 to lift up, the air in the concave surface of the suction cup 10 forms a negative pressure, and the soft suction cup 10 is securely pressed on the object. In some embodiments, the upper connection shield 60 might define an internal threaded hole, so that some articles or products (e.g., camera equipments) with external threaded portion can be fixed onto desired surface by screwing the external threaded portion into the external threaded portion.

The positioning marble 30 rotates synchronously along with the pressure driving nut 40. In particular, the positioning marble 30 shifts from a position corresponding to the off blind hole to another position corresponding to the start blind hole. As a result, positioning of the pressure driving nut 40 and the sucker switch handle 50 is achieved.

When releasing the suction cup 10 or object, by inversely rotating the sucker switch handle 50, i.e., the handle 52 shifts from "off" to "on", the pressure driving nut 40 is driven to rotate synchronously. Then, the threaded rod 11 and the suction cup 10 are recovered their original positions, the suction cup 10 is departed from the sucked object or surface.

The positioning marble 30 rotates synchronously along with the pressure driving nut 40 and then shifts from a position corresponding to the start blind hole to another position corresponding to the off blind hole, and falls into the off blind hole. As a result, the pressure driving nut 40 and the sucker switch handle 50 are located at a position marked "off".

In the sucker base device 100, when the pressure driving nut 40 is driven, e.g., through the sucker switch handle 50, to rotate without elevation, the threaded rod 11 elevates and carries the suction cup 10 to elevate, so as to form a negative pressure between the suction cup 10 and a surface of sucked object. Accordingly, the device 100 is able to fetch and optionally further carry object. When the pressure driving nut 40 is reversely rotated, the threaded rod 11 and the suction cup 10 are driven to be initial position and status, and then the object is released from the suction cup 10. The sucker base device 100 has a compact structure with screw lifting structure inside to stably sucking an object, and is readily operated. Thus, the present device has compact and ingenious structure, lowered cost, and is readily to be realized and popularized.

It is to be noted that the above-mentioned descriptions represent merely the exemplary embodiments of the present disclosure, without any intention to limit the scope of the present disclosure thereto. Those skilled in the art should understand that the present invention may have various modifications and changes. These modifications, equivalent replacements, improvements, etc., made within the spirit and principle of the present invention should be included in the scope of protection of the present invention.

What is claimed is:

1. A sucker base device comprises:
    a suction cup, a threaded rod being connected to an upper surface of the suction cup and having a protrusion section exposed outside a top surface of a cup upper cover;
    the cup upper cover covering the suction cup, and
    a pressure driving nut, which is threaded to the protrusion section of the threaded rod, is supported on the top surface of the cup upper cover, and is allowed to a rotary motion; wherein the suction cup has a connection portion through which the threaded rod is connected to the suction cup, the threaded rod penetrates through a top surface of the cup upper cover, the threaded rod is driven to move by rotating the pressure driving nut, and thus carries the connection portion of the suction cup to lift up towards the cup upper cover, so as to form a negative pressure between the suction cup and a surface of an object; wherein a middle top of the cup upper cover defines a mounting hole through which the threaded rod penetrates, the top surface of the cup upper cover defines an annular groove which is disposed around the mounting hole, a bottom wall defining the annular groove defines two pairs of first blind holes.

2. The sucker base device according to claim 1, wherein the suction cup comprises an adsorption edge and the connection portion connected to the threaded rod, a lower surface of the adsorption edge has a height difference with respect to a bottom surface of the connection portion to form an adsorption space, and an outer surface of the threaded rod is provided with three or multiple loops of threads.

3. The sucker base device according to claim 2, wherein a top surface of the suction cup is provided with a protrusion ring which is adjacent to the adsorption edge and has a relative height with respect to a top of the adsorption edge, the protrusion ring is disposed around the connection portion, the connection portion is spaced from and connected to the protrusion ring by a soft portion, an upper surface of the protrusion ring is provided with a plurality of first teeth uniformly arranged thereon, a bottom surface of the cup upper cover is provided with a plurality of second teeth uniformly arranged at an edge thereof, and the second teeth are disposed on the first teeth so that the first teeth engage to the second teeth.

4. The sucker base device according to claim 2, wherein a vent handle extends from a lateral surface of the suction cup along a radial direction of the suction cup, the vent handle is configured for causing air to enter the adsorption space, and thus recovering atmospheric pressure status in the adsorption space.

5. The sucker base device according to claim 4, wherein the pressure driving nut is in a cylindrical form, a bottom edge of the pressure driving nut defines a pair of second blind holes opening upwards, the pair of second blind holes is positioned to face one pair of the first blind holes at desired rotary angle, and a positioning marble assembly is provided in each of the two second blind holes.

6. The sucker base device according to claim 5, wherein the device further comprises a sucker switch handle which extends from a periphery of the pressure driving nut, or alternatively extends from a periphery of a sheath engaged to the periphery of the pressure driving nut, for facilitating to push the pressure driving nut through the sucker switch handle, the sheath carrying the pressure driving nut to rotate.

7. The sucker base device according to claim 5, wherein the device further comprises a sucker switch handle which extends from a periphery of a sheath engaged to the periphery of the pressure driving nut, for facilitating to push the pressure driving nut through the sucker switch handle, the pressure driving nut is provided with a plurality of first vertical teeth uniformly arranged in the outer sidewall thereof, and the sheath is provided with a plurality of second vertical teeth uniformly arranged in the inner sidewall thereof and the second vertical teeth engage to the first vertical teeth.

8. The sucker base device according to claim 4, wherein the device further comprises an upper connection shield, two inner threaded columns are provided on an upper edge of the cup upper cover and are disposed adjacent a periphery of the annular groove, the two inner threaded columns are disposed at an extension line of a diameter of the annular groove, and the upper connection shield engages to the two inner threaded columns by bolts and is disposed above the pressure driving nut.

9. The sucker base device according to claim 1, wherein the pressure driving nut comprises an inner sidewall and an outer sidewall, and the inner sidewall is provided with an inner thread through which the pressure driving nut engages to an outer thread of the threaded rod.

* * * * *